US008086239B2

(12) United States Patent  
Elmaleh

(10) Patent No.: US 8,086,239 B2  
(45) Date of Patent: *Dec. 27, 2011

(54) INFRASTRUCTURE FOR WIRELESS TELECOMMUNICATION NETWORKS

(76) Inventor: David R. Elmaleh, Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/691,120

(22) Filed: Jan. 21, 2010

(65) Prior Publication Data

US 2010/0208681 A1    Aug. 19, 2010

Related U.S. Application Data

(63) Continuation-in-part of application No. 11/404,644, filed on Apr. 14, 2006, now Pat. No. 7,660,573.

(51) Int. Cl.
*H04W 40/00* (2009.01)

(52) U.S. Cl. ............... 455/446; 455/444; 455/552.1; 455/452.1

(58) Field of Classification Search ............ 455/405, 455/406, 414.1, 422.1, 426.1, 443, 444, 445, 455/446, 449, 451, 450, 452.1, 454, 464, 455/524, 526, 550.1, 553.1, 561; 370/310, 370/331, 328, 338
See application file for complete search history.

(56) References Cited

U.S. PATENT DOCUMENTS

| | | | |
|---|---|---|---|
| 6,804,219 B2 | 10/2004 | Koo et al. | |
| 6,985,432 B1 | 1/2006 | Hadad | |
| 7,043,225 B1 | 5/2006 | Patel et al. | |
| 2002/0085645 A1 | 7/2002 | Hadad | |
| 2002/0098870 A1 | 7/2002 | Kashiwagi et al. | |
| 2003/0119480 A1 | 6/2003 | Mohammed | |
| 2004/0087327 A1 | 5/2004 | Guo | |
| 2004/0224691 A1 | 11/2004 | Hadad | |
| 2005/0002323 A1 | 1/2005 | Hadad | |
| 2005/0009505 A1 | 1/2005 | Triebel | |
| 2005/0025042 A1 | 2/2005 | Hadad | |
| 2005/0089052 A1 | 4/2005 | Chen et al. | |
| 2005/0186959 A1 | 8/2005 | Vialen et al. | |
| 2005/0207334 A1 | 9/2005 | Hadad | |
| 2005/0207446 A1 | 9/2005 | Hadad | |
| 2005/0288027 A1 | 12/2005 | Cho et al. | |
| 2006/0072678 A1 | 4/2006 | Hadad | |
| 2007/0135109 A1* | 6/2007 | Walter et al. | 455/415 |
| 2007/0160017 A1* | 7/2007 | Meier et al. | 370/338 |
| 2007/0177510 A1 | 8/2007 | Natarajan et al. | |
| 2007/0177545 A1 | 8/2007 | Natarajan et al. | |
| 2007/0232358 A1* | 10/2007 | Sherman | 455/560 |
| 2007/0237093 A1* | 10/2007 | Rajagopalan et al. | 370/254 |

OTHER PUBLICATIONS

Leu, et al., A Framework for Cognitive WiMAX with Frequency Agility, Special Issue on Cognitive Radio of The Proceedings of IEEE, Jun. 2008, Abstract.

(Continued)

*Primary Examiner* — Jean Gelin
(74) *Attorney, Agent, or Firm* — Hart Law LLC

(57) ABSTRACT

A wireless network including a plurality of base stations operating at a public spectrum frequency, each base station capable of generating an adjustable size coverage area. Each base station utilizes dedicating channels for each user to permit avoidance of one or more sources of interference. A server supplies data to the base stations, and managing billing and access to the wireless network. A plurality of base stations employs transmissions in the unlicensed spectrum (i.e. 3.6 and 5.7 GHz in the US) for permitting flexibility in transmission power and additional subchannel/subcarrier interleaving capability for mitigating interference.

22 Claims, 3 Drawing Sheets

OTHER PUBLICATIONS

Mishra et al., Cognitive Technology for Ultra-Wideband/WiMax Coexistence, New Frontiers in Dynamic Spectrum Access Networks, DySPAN 2007, 2nd IEEE International Symposium, Dublin, Apr. 17-20, 2007, pp. 179-186, ISBN: 1-4244-0663-3.

PCT International Search Report from PCT/US2007/09162 dated Jan. 2, 2008.

Koffman, Broadband Wireless Access Solutions Based on OFDM Access in IEEE 802.16, IEEE Communications Magazine, Apr. 2002.

* cited by examiner

INFRASTRUCTURE FOR WIRELESS TELECOMMUNICATION NETWORKS

CROSS REFERENCE TO RELATED APPLICATIONS

The present application is a continuation-in-part of and claims the benefit under 35 U.S.C. §120 of U.S. patent application Ser. No. 11/404,644, filed on Apr. 14, 2006, now U.S. Pat. No. 7,660,573 which is incorporated herein by reference in its entirety.

FIELD OF THE INVENTION

The present invention relates to a system for a mobile broadband wireless access infrastructure extending across great distances that can operate in the licensed and unlicensed radio spectrum.

BACKGROUND OF THE INVENTION

Currently, the model of providing wireless telecommunication services involves mobile service providers expending enormous amounts of capital to acquire network infrastructure equipment, and licenses to use the Federal Communication Commission (FCC) regulated operating frequencies. These capital expenditures can result in increased consumer billing rates that can often inflate far above the actual cost of service.

In addition, the use of regulated licensed frequencies itself can be problematic, due to the lengthy, expensive, and uncertain regulatory review process. Oftentimes, the review process can be susceptible to political and commercial interests and pressures. For these same reasons, the regulatory review process can also be problematic, and difficult to navigate when a mobile service provider wishes to introduce new technologies and applications to the public.

In recent years, unlicensed frequencies, primarily in the 2.4 GHz range have been used for wireless LANs. Examples include WiFi hot spots configured on a site-specific basis to provide on-site connectivity to access points. For the most part, the wireless LAN technologies do not have sufficient reach to extend beyond the site of the wireless network. Therefore, service may be often available only to a limited area within the relevant premises. For example, wireless LAN connectivity in a lobby, or business lounge of a hotel may not extend to the rooms on an upper floor or outside the building.

The end result of these limitations is a wireless broadband market that cultivates high consumer retail prices, while delaying the introduction and implementation of new technologies.

SUMMARY OF THE INVENTION

The present invention provides in one embodiment, a wireless broadband network having a plurality of base stations that can operate at a public spectrum frequency. Each base station can allocate dedicated channels to one or more users for data transmission and to minimize interference. In one embodiment, each base station can be interspersed so that its coverage area, which can be adjustable in size, partially overlaps at least some of the adjacent coverage areas, thereby creating an expansive wireless broadband network, to which data can be transmitted, received, and managed.

The present invention, in another embodiment, provides a method of utilizing a wireless network to transmit and receive broadband data communications. The method includes providing a plurality of base stations that can operate at a public spectrum frequency, and causing the base stations to generate overlapping coverage areas thereby forming an expansive network. The base stations can also generate one or more channels, each of which can be dedicated to a particular user for data transmission, and to minimize interference within a coverage area. Users may be allowed to access the network at any point in the network, in order to transmit and receive data on a channel from a base station to adjacent base station along the network.

The present invention, in another embodiment, provides a method of billing wireless network subscribers. The method can include providing a plurality of base stations designed to operate at a public spectrum frequency. Each base station can generate overlapping coverage areas that are adjustable in size, so as to create an expansive network. Users may be allowed to access the network from within any coverage area in order to transmit and receive data. Each base station can generate one or more channels, which may then be assigned and dedicated to a particular user for data transmission and to minimize interference within the coverage area. Users may be monitored in order to credit all points of their network interaction and usage. Users can then be billed for their usage of the wireless network based on defined parameters, which may include user airtime, per content view, or by download.

In another embodiment of the present invention, a cellular system of a user may be polled via the base stations to determine a home network access point of the user. Thereafter, the user may be billed for network usage taking into account, whether the network access occurred in the home network area or from a remote access point.

In another configuration, disclosed herein are methods for lowering interference in the licensed and unlicensed spectrum by interleaving between unlicensed frequencies, using architectures for inter and intra base stations communication, smart antennas and Network Operation Centers in addition to the increased capacity using channels and sub channels modulations technologies based on OFDMA or CDMA.

A WiMax implementation as disclosed herein encounters frequency spectrum usage issues with other transmissions on the same or adjacent frequencies. Interference occurs from other transmissions sufficiently close in frequency or geography. Governmental regulations typically impose a regulatory domain for frequency usage, imposing bandwidth and power guidelines, typically according to a licensing scheme, which limits available frequencies and usage. Entities such as the U.S. FCC (Federal Communications Commission) and its equivalent in other countries subdivide available bandwidth ranges (bands) according to prescribed usages. However, different sovereigns (governmental entities) often allocate different frequency ranges for similar types of compatible communications. For example, the US licenses WiMax communications according to IEEE 801.16e in the 2.5 GHz band range, while Europe typically employs the 3.6 GHz and 5.7 GHz range. Configurations herein are based, in part, on the observation that wireless communications employing WiMax and similar OFDMA transmissions in the unlicensed spectrum (i.e. 3.6 and 5.7 GHz in the US) allows flexibility in transmission power and additional subchannel/subcarrier interleaving capability for mitigating interference.

Other configurations employ the unlicensed spectrum for OFDMA and similar transport mechanisms on platforms such as HSPA (High Speed Packet Access), HSPA+ LTE, (Long Term Evolution), LTE Advanced, 3GPP (3rd Generation Partnership Project) and others as well as WiMax Packet Core.

In an example arrangement, the disclosed wireless network includes a plurality of wireless base stations operating at a public spectrum frequency, such that the public spectrum frequency is selected to be outside a regulatory domain of frequencies in the location where the base stations are deployed. The wireless base stations each provide a plurality of overlapping coverage areas, in which each coverage area is generated by one of the base stations, thus forming a Wide Area Network (WAN). For each base station, at least one band in the public spectrum frequency is assigned. Each base station therefore provides subchannels generated by the base station in the assigned band, such that each sub channel has a plurality of Orthogonal Frequency Division Multiple Access (OFDMA) sub-carriers, and each sub-channel being dedicated to a particular user for data transmission and to minimize interference within the coverage area, so that the base stations are configured to minimize interference by interleaving around the interference.

In the example arrangement, the bands are WiMax bands, having a span sufficient to support a typical 32 subchannels each having 48 subcarriers, such as 900 MHz, 2.4 GHz, 3.65 GHz and 5.7 GHz. Thus, each wireless base station is configured to operate in the assigned band according to the IEEE 802.16e standard. Alternatively, other bands supporting alternate transport mediums such as those outlined above may be employed. The wireless base stations are configured to identify bands available at other wireless base stations, and interleave by selecting an alternate band for transmission to the other wireless base station.

A network operation center or other central gathering repository employs a processor to gather, from each wireless base station, usage data defining, for each user, subcarrier, subchannel and band usage, the usage data for permitting billing data collection, Internet interface connectivity metrics, clearinghouse and settlement services.

In further detail the wireless network comprises a plurality of base stations operating at a public spectrum (e.g. unlicensed) frequency, such that each base station is designed or altered to operate in accordance with a broadband standard. The base stations define a plurality of overlapping coverage areas, each coverage area being generated by base station so as to create an expensive Wide Area Network (WAN), and provide a set of channels generated by each base station, such that each channel has a plurality of Orthogonal Frequency Division Multiple Access (OFDMA) sub channels, and each sub channel is dedicated to particular use for data transmission and minimize interference within the coverage area, the base stations minimizing interference by interleaving around the interference. A processor in a network operation center (NO) couples to each base station to permit billing data collection, internet interfacing, clearing house and settlement services.

The processor is configured to gather, from each wireless base station, usage data defining, for each user, subcarrier, subchannel and band usage, the usage data for permitting billing data collection, Internet interface connectivity metrics, clearinghouse and settlement services. The unlicensed frequency avoids metering of wireless communication for billing and roaming assessment by wireless carriers of fee-for-services arrangements in the licensed spectrum, thus a user need not rely on a native cellphone as long as WiFi is available.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
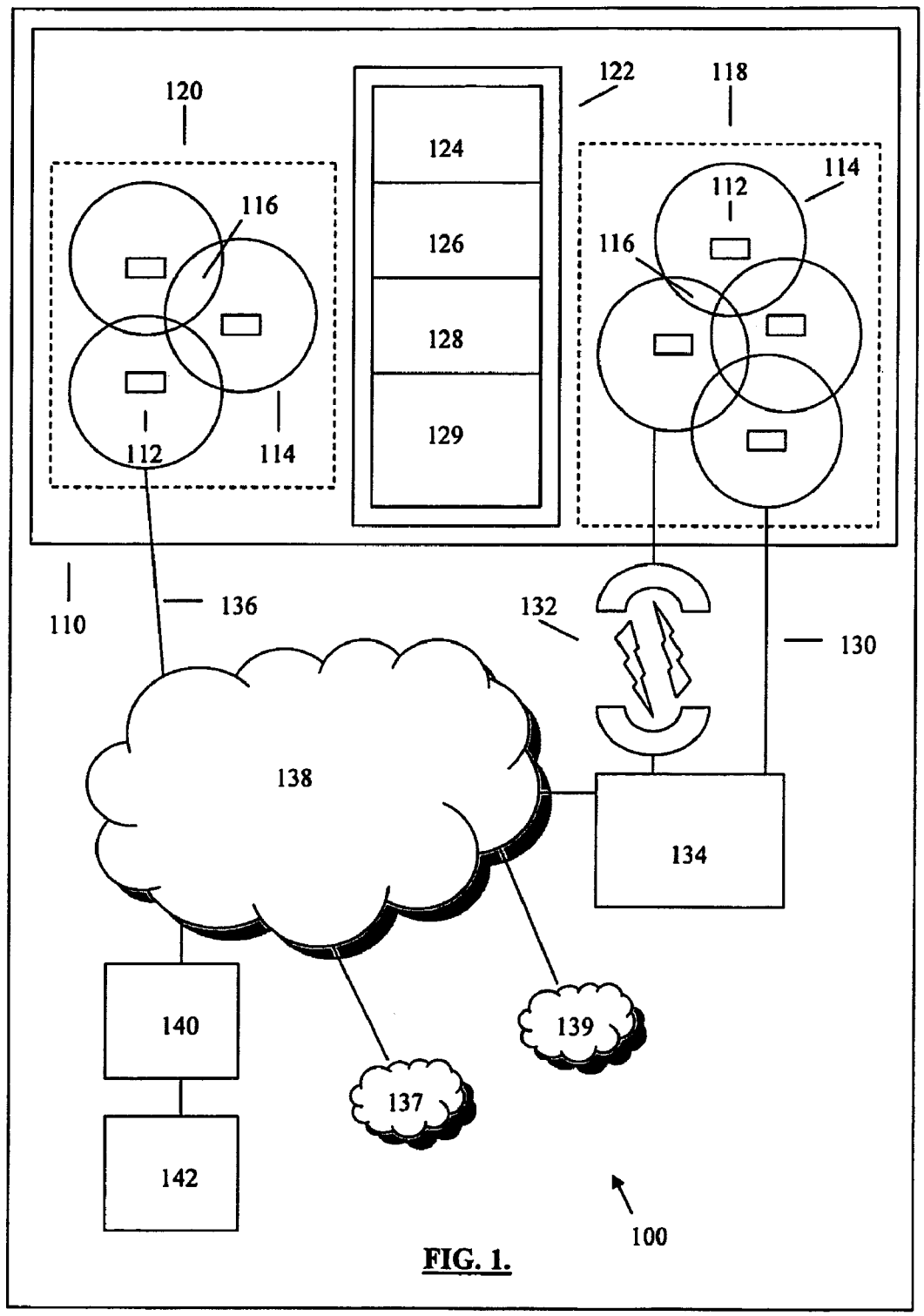
FIG. 1 illustrates a system architecture and accompanying interfaces, in accordance with an embodiment of the present invention.

In the present invention, a solution is presented that can reduce the foregoing limitations, and provide the public with a more affordable, robust, and accessible, wireless broadband access service that can be platform independent. This objective may be achieved by introducing a technical specification for building a network infrastructure that can enable national convergence of, for example, voice over IP, video mobility, Internet access from any location, and TV access on a desktop computer or laptop.

The disclosed technology can operate in the licensed and unlicensed radio spectrum. However, in one embodiment, the disclosed technology utilizes the public domain (unlicensed) spectrum, and avoids interference with other public domain spectrum users.

In general, the disclosed technology calls for "weaving" a wireless broadband network together from a plurality of base stations deployed in existing locations, e.g., businesses, telephone poles, towers, and operating in the unlicensed frequency spectrum. The use of unlicensed frequencies, in one embodiment, can avoid the heavy costs of frequency acquisition. This, together with the relatively low cost of base stations reduces infrastructure costs significantly and would enable the granting of services at low retail prices.

Underlying Technology

To implement the network for use in connection with the present invention, in an embodiment, WiMax technology may be used. In particular, WiMax in one embodiment, includes the IEEE 802.16 a/e/d broadband point-to-multipoint wireless access standards. These standards may be commonly referred to as fixed WiMax (802.16a-d), and mobile WiMax (802.16e). Optimal WiMax operating conditions with respect to range and broadband applications require a spectrum range of 2.0 GHz-2.4 GHz or higher.

In one embodiment of the present invention, the underlying technology can be based on Orthogonal Frequency Division Multiple Access (OFDMA), which originated from CDMA technology, and supports wireless broadband communications across a variety of platforms, e.g., cellular, broadband wireless access (BWA). OFDMA is the preferred solution for the IEEE 802.16a/e/d Broadband Wireless Access standards.

The OFDMA technology, in an approach, can sub-divide high-speed data signals into, for example, multiple lower speed signals. This can result in increased tolerance to noise and minimize interference caused by multi-path transmission of signals which may be created by chance obstructions in the path of a signal. At the same time, this sub-division can enable efficient use of bandwidth allocation. In other words, OFDMA can provide wide-area, multi-point coverage along with a multiplicity of high-speed channels over a single frequency band.

OFDMA can further divide a signal into sub-channels, with each sub-channel being allocated to a different subscriber. Sub-channeling in WiMax, in an embodiment, allows multiple users to transmit, for instance, on the uplink with substantially similar aggregate transmission rate as for instance, the downlink. Each subscriber, in an embodiment, can be treated separately independent of location, distance from the base station, interference and power requirements. In addition, various modulations can be used for each of the carriers in the system to provide improved coverage and throughput, e.g., QPSK, 16QAM, 64QAM, 256QAM.

OFDMA technology can also be modified, in accordance with an embodiment of the present invention, to provide real wireless broadband mobile services. This elusive combination of wireless broadband with true mobility is considered by many in the industry as an ultimate goal which embodies the convergence of the various technologies and media. It should be emphasized that the capabilities of OFDMA by far exceed those of cellular 3G (third generation technologies) in terms of uplink and downlink speed, mobile speed, etc., and are actually considered 4G technology (providing for speeds of up to 1 megabit for devices traveling at up to 60 kilometers per hour).

In addition, OFDMA-based products can be compatible with "smart antenna" technologies (e.g., antenna array beamforming, antenna diversity at base stations and subscriber stations) that can enhance the signal penetration even in the harshest environments.

An embodiment of the invention will now be described by way of non-limiting example, and with reference to the accompanying drawings.

In one embodiment of the invention shown in FIG. 1, a network provider 110 such as a WiMax network provider, manages at least two WiMax networks 118, 20. Each of the networks 118, 120 may include a plurality of base stations 112. Each base station 112 may be designed to include a WiMax (IEEE 802.16 a/e/d) radio, and enabling architectures for mobile broadband radios in both the unlicensed public domain radio spectrum (e.g., 2.4 GHz) and in the licensed frequency bands. Therefore, each base station can be capable of operating in both licensed and unlicensed spectrums.

Figure 2:
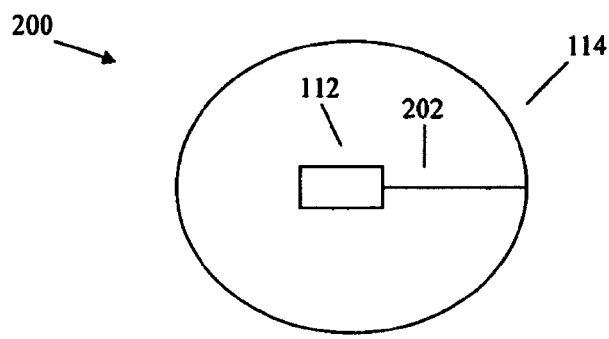
FIG. 2 illustrates a base station and network cell for use in connection with the present invention.

With reference to FIG. 2, a base station 112 in one embodiment, can be designed to transmit a signal to create a network cell 114. The size of the network cell 114, as defined by the coverage range radius 202, can vary depending on the output power of the base station 112 transmission. For example, if the base station transmits in the unlicensed public spectrum at 2.4 GHz and 1 watt (due to FCC restrictions on signal strength) the coverage range radius 202 can be up to 1.5 km. However, if the same base station 112 transmits in the licensed spectrum at high power, the coverage range radius 202 can be up to 50 km. To that end, larger network cells 114 can be created by high power signal transmission, resulting in widespread access and less base stations 112.

Figure 3:
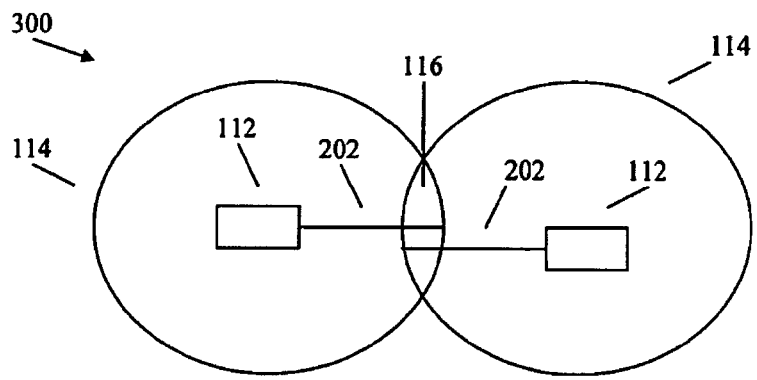
FIG. 3 details an aggregation of cells in which the overlapping cell regions provide partial redundant coverage thereby forming a wireless network cluster.

Each base station 112, in an embodiment, can be deployed, for instance, on ground level or on existing infrastructure. For example, in cities, tall buildings and towers can be utilized. In rural settings, buildings, ground-level platforms, and telephone poles can suffice. Referring now to FIG. 3, each base station 112 may be deployed in the vicinity of other base stations 112, such that their respective network cells 114 partially overlap one another, thereby creating a redundant coverage region 116. This redundant coverage region 116 essentially merges the respective network cells 114, thereby forming a single, expansive, broadband WiMax network 300. In an embodiment, such an expansive WiMax network having enough network cells 114 and redundant coverage regions 116, can provide coverage for the entire United States.

Referring again to FIG. 1, by interspersing the base stations 112, so that adjacent network cells 114 overlap, redundant coverage regions 116, may be created, so that a WiMax network 118, 120 can be expanded and can completely blanket a particular area, e.g., United States, Europe. For example, a rough estimate of the required number of base stations 112 to cover and provide coverage to the entire United States can be from about 30,000 to about 40,000.

As discussed above, the WiMax networks 118, 120 can simply be an aggregation of the network cells 114 generated by the interspersed base stations 112. The present invention, in an embodiment, can be designed to minimize interference in a public frequency spectrum, e.g., 2.4 GHz. Interference can be caused by many sources including multipath reflections, jitter, and cross-talk.

In particular, a chip set and algorithm can be provided that senses the public interference, and prevents its interaction by interleaving around the potential interference, interpolation, or hopping to another available access point. More, specific technical details on attributes (interference avoidance, OFDMA sub-channeling) of the system are elaborated in the published patent applications: 20060072678 System and method for cellular communications, 20050207446 Synchronization system and method, 20050207334 OFDM communication channel, 20050025042 Bi-directional communication channel, 20050002323 Cellular network system and method, 20040224691 Handoff system and method, 20020085645 Bi-directional wireless communication, all of which are hereby incorporated by reference.

Multipath interference caused by signal reflections that may be out of phase, can also be mitigated by traditional methods, such as rake receivers as well as by using antenna array beamforming, antenna diversity at the base station and at the subscriber station.

The networks 118, 120 can further provide decentralized network coverage, control, and services. In particular, each base station 112, by design, can operate independently of the other base stations 112. As such, the service provider 110 can supply separate data for each base station 112. Such a format allows a higher level of reliability and access during system failures. For example, if a base station 112 fails, its respective network cell 114 can no longer exist. As a result, users in that network cell 114 may lose service. However, the remaining independently operating base stations 112 may remain unaffected and stay operational. The overall network 118, 120 consequently remains intact.

Network users located in the redundant coverage regions 116 of the failed cell 114 may also remain unaffected, because adjacent cells 114 support service in the redundant coverage regions 116. Specifically, users located in redundant coverage regions 116 essentially can receive support from multiple base stations 112. For example, if a user is located in a redundant coverage region 116 made up of three overlapping cells 114, there are three base stations that can provide coverage to that location. Based on quality of service criteria, one of the three base stations 112 will service the user. Continuously during this process, user equipment (cell phone, laptop, etc.) and base stations 112 interact through polling to assure that the quality of service criteria are maintained. If the quality of the connection deteriorates below a threshold, a soft handoff to another base station meeting the quality of service criteria may be performed.

Therefore, when one cell 114 fails, the user equipment being utilized to interface with the failed base station 112 and the surrounding base stations 112, sense the failure, and a soft handoff to the nearest base station 112 having acceptable quality of service criteria is performed. The transition can be seamless. For those network users that do lose service due to the failure of the base station 112, they need only to move into the nearest network cell 114 to regain service.

In accordance with one embodiment of the present invention, a WiMax network 118 can be connected to, for instance, the Internet 138 by a DSL/cable modem 130 or microwave link 132, through a local Internet Service Provider (ISP) 134, in order to gain access to remote networks or cell phone systems. However, a WiMax network 120 can also have a direct connection 136 to the Internet 138 to accomplish similar results. It should be noted that every base station 112 in the networks 118, 120 may not have to be connected the Internet 138. In fact, the connectivity to the Internet 138 of one base station 112 in networks 118, 120 can be through another base station 112 in the same respective network 118, 120.

Internet connectivity can be important, because it provides a method of linking remote networks. For example, in FIG. 1, WiMax network 118 and WiMax network 120 may be isolated from each other. As such, a wireless user in network 118 may communicate with another wireless user in network 120 by using the Internet 138.

Specifically, the user in network 118 can connect to the Internet by DSL/cable modem 130 or microwave link 132, through an ISP 134 and into the Internet 138. The data can then be transferred via direct connection 136 to WiMax network 120, and the appropriate wireless recipient in cell 114. Through this method, broadband data, e.g., voice over IP, video, data streams, Internet access, TV, can be routed to and from remote networks 118, 120 via the Internet 138.

In addition, using this system architecture 100, cellular phone communications can be accomplished, thereby minimizing the need for satellite links and cell towers. For example, instead of a cell phone linking up to a nearby cell tower, it senses the nearest local base station 112 in a WiMax network and connects. The call can then be transferred via direct connection 136, or through an ISP 134 to the Internet 138, and then onto the cellular operator's gateway 140 and into the phone system 142.

The disclosed technology delivers seamless broadband data connections. Users can transition and communicate between network cells 114 and across entire networks 118, 120 seamlessly. A user in a network cell 114 can communicate with another user located in a network cell 114 on an opposite end of the WiMax network 118. Moreover, real-time video transfers to vehicles moving at highway speeds through the network 118 can be achieved. The sensing and hopping over other public users allows instant ad-hoc connectivity of the users amongst themselves in real-time.

In addition, the users can connect to the WiMax network 118 from any point in the network with a variety of communication peripheral devices, e.g., cellular handsets, PDA, laptops, digital TV converters. For example, assuming the entire United States had WiMax network coverage, a user accessing a cell 114 in Miami, Fla. with a cell phone or laptop can communicate with users and access services anywhere in the network, e.g., Seattle, Boston.

Further, as a result of the network's interwoven network fabric, fast tracking can be readily available without the need of GPS satellites. Therefore, an additional benefit of the invention can be that it provides for a cost effective way to build a more efficient telephony, and Internet network in the public domain. Such a system can then be operated in the licensed spectrum resulting in much stronger and efficient coverage.

Billing Clearinghouse & Network Management

The system architecture 100 also comprises a billing and network management system 122, which can be operated by, for instance, the service provider 110, or can be outsourced to a third party vendor. The actual services that can be provided include billing data collection 124, Internet interfacing 126, network access management 128, and billing clearinghouse and settlement services 129.

As discussed above, the service provider 110 can supply separate data for each base station 112 in the WiMax networks 118, 120. In one embodiment of the invention, each base station 112 can be located in, for instance, a business or establishment of a licensee, e.g., McDonalds, Starbucks, Marriot. However, since a user can gain access to the networks 118, 120 at any base station 112 in the networks 118, 120, and since there can be a substantial amount of coverage overlap for each base station 112 (especially in cities), a sophisticated billing clearinghouse system 129 can be utilized to handle billing.

The billing clearinghouse system 129 may credit all points of user-network interaction, subtract out duplicate charges, and divide revenues in the redundant coverage regions 116. Such a clearinghouse system 129 can be acquired as a turnkey solution from, for instance, Elgadcom Group in Azur, Israel or its subsidiary FTS Company, which specializes in billing and customer care solutions for wire-line and wireless operators. The billing data collection provided by the clearinghouse 129 may further include identifying a carrier providing the wireless service called for by a user in a particular geographic area, identifying a user and corresponding billing information, and reconciling the provided wireless services with the billing information of the user.

In an embodiment, the network management system 122 can retrieve user information from the base stations 112. This information can, for instance, identify the home networks of users. The information can be acquired during the polling process (described above) that occurs between the cellular systems of a user and base stations 112, while a user is in the WiMax networks 118, 120. If a remote connection must be made for the user, the information can then be used to connect the user through that home network 137 rather than through another Internet accessible network 139. This allows the user to utilize remaining minutes from a home pool instead of a roaming pool of minutes. In addition, users accessing the WiMax network 118 who are actually subscribers of WiMax network 120 may automatically be charged an amount that reflects the percentage use in network 118, and maybe a percentage allocated to the subscriber home WiMax network 120.

The service provider 110 can also supply network access management 128. Network users can purchase pre-paid access cards, or can charge their credit card in order to gain an access key. The access key can then be used to enter the networks 118, 120. Users can be billed by airtime, per content view, or download.

In a particular configuration, an OFDMA environment according to the WiMax 802.16e or other standard using a combination of regulated and unregulated frequency bands may be employed. Various countries partition and regulate particular ranges of frequency bands, in particular the 900 MHz-6.0 GHz range commonly employed for WiMax communications. According to the 802.16e standard applicable to WiMax communications, operation is feasible for frequencies up to 10 GHz, however the entire range has not yet been pursued for commercial development. Further, other evolving standards, such as Ultra-Wide Band (UWB), Long Term Evolution (LTE), LTE advanced, HSPA, HSPA+ and 3GPP are pursuing this bandwidth space.

Utilization of the unregulated bandwidth space is beneficial in certain circumstances. For example, in the US, the 3.5 GHz and 5.8 GHz ranges are not regulated for WiMax (hence referred to as the unlicensed bands), however, in Europe and Asia the 3.5 GHz is a common WiMax conduit. In the US, regulated WiMax transmissions are limited to 1 watt, limiting the size of a coverage area emanating from a base station (BTS). However, transmission in the unlicensed bands permits up to 4 watts of transmission power, providing a larger coverage area from a single BTS. Technology such as power regulation, QAM, (Quadrature Amplitude Modulation) and 16.256 QPSK (Quadrature Phase Shift Keying) may be employed to mitigate interference by performing higher power transmissions only to the outer regions of a coverage area where it is needed to communicate effectively, and reducing power for closer destinations.

A further feature of WiMax is the use of Listen-Before-Talk (LBT) operations to detect potential interference and mitigate around it by redirecting communications to base stations around the potential interference, interleaving communication on other frequencies (subcarriers), and regulating power to overlapping coverage areas. Similar to conventional Ethernet implementations, which employed CSMA (Carrier Sense Multiple Access) logic to detect and avoid concurrence collisions, LBT may be employed to identify potentially interfering frequency use and mitigate around it. For example, in an OFDMA environment, subchannels each employ non-consecutive subcarriers in a particular frequency band. If potential interference is detected from an adjacent subcarrier (i.e. for another users communication), non adjacent subcarriers sufficiently removed from the purported interference may be employed.

Figure 4:
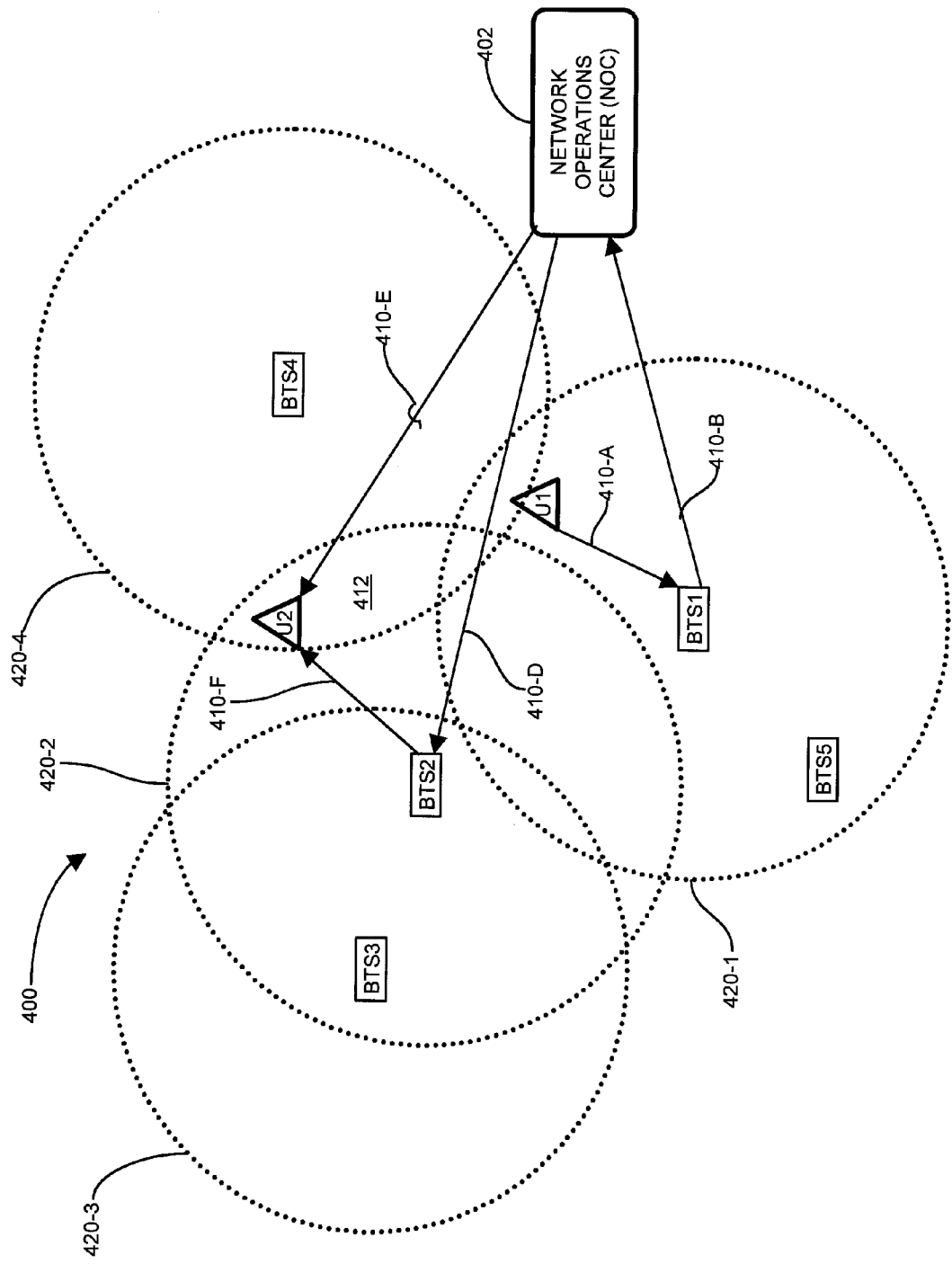
FIG. 4 shows a communications environment suitable for use with the unlicensed spectrum (bands).

Referring to FIG. 4, a communications environment 400 suitable for use with the unlicensed spectrum (bands) is shown. In FIG. 4, the environment 400 is operable according to WiMax, LTE, UWB or other suitable standard, and includes a plurality of base transceiver stations (base stations) BTS1 ... BTS4, each having an effective coverage area 420-1 ... 420-4, (420 generally) denoted as a radius from the respective BTS. In the environment 400, the BTSs may vary the coverage area 420 radius by adjusting transmitting power, since in the unlicensed bands power usage is more flexible than in the regulated, or licensed, spectrum.

In the example communications environment, the base stations (micro, femto regular etc) are spread as a mosaic or tile pattern designed to cover a topographic area. Each base station BTS1 ... BTS4 may have separate frequency bands in the unlicensed bands, for example BTS1=2.4 GHz, BTS2=3.65 GHz, BTS3=900 MHz, BTS4=5.7 GHz. In contrast to conventional approaches, such as regulated U.S. WiMax usage, each base station may employ one or more of several bands in the unlicensed spectrum. Therefore, in addition to subcarrier and subchannel selection within a band, a communication may interleave around interference by invoking a separate band (e.g. 900 MHz, 2.4 GHz, 3.65 GHz and 5.7 GHz in the example shown).

As an example of how to hop, or interleave, around frequencies (in addition to the OFDMA or LTE frequency modulations), user U1 would like to communicate with user U2 and potential interference is detected, possibly due to U2 being located in an overlap zone 412 of coverage areas 420-2 and 420-4. The communication signal from U1 goes to the corresponding base station BTS1, as shown by 410-A, using a band at 2.4 GHz. BTS1 sends the communication signal to a Network Operation Center (NOC) 402, as shown by arrow 410-B. As indicated above, the nature of WiMax includes the LBT aspect for detecting potential interference. If there is no interference detected, the transmission goes directly to U2 via 410-E. However, in the case of interference, the communication travels from the NOC 402 to BTS2 at 3.65 GHz, as shown by arrow 410-D, and from BTS 2 to U2 directly as shown by arrow 410-F, or alternately or indirectly via an additional use of the NOC 402. BTS2, being closer to U2 than the NOC 410, may be less susceptible to interference in the overlap zone 412. Alternatively, the 3.65 GHz band employed by BTS2 may be different than the band employed for path 410-E, thus further contributing to the interference mitigation.

The NOC 402 interconnects the BTSs to the applicable telecommunications infrastructure, and maintains a wired, wireless, or satellite link to individual BTSs for transferring communications from users. In conventional approaches, the BTSs employed the licensed frequency for WiMax communications, thus being limited to the 2.4 GHz band. In contrast, the above example illustrates interleaving using not merely subcarrier switching in a user subchannel, but also the use of alternate bands in the unlicensed spectrum, which further allows for greater power regulation to augment the range of individual BTSs, and also to mitigate interference by reducing power accordingly when needed. Therefore, configurations herein substantially overcome the shortcomings of interference of conventional WiMax communications in the licensed bands (frequencies) through the following features:

1. WiMax is a listen-before-talk (LBT) medium, which mitigates interference in the licensed and unlicensed spectrum. However, interference is also a result of system overload. The unlicensed spectrum is more vulnerable to that than licensed, due to police, fire department, local government and other group users.

2. WiMax is limited in for mobile communications; the main reason is the FCC limitation of power transmission to one watt. In many countries, 4 watts is permitted, thus mobile communications will be available especially in rural habitats. This power level is optimized in populated areas where power blasting may increase interference and make the unlicensed spectrum more vulnerable to interference. However, in rural area this should not be of high consideration, as allowing a 4 watt for example should provide increased communication. Networks and mobility for "last mile" locations are important especially for radio and backhaul. This rule may change and mobile unlicensed will become useful.

3. WiMax based on the IEEE 802.11 standard brought about the next generation of IEEE 802.16 and 802.20 standards are evolving. These and other standards, formed and being formed versions, such as LTE, LTE advanced, HSPA and HSPA+ use OFDMA as basis for their evolution. Base station production of channels, sub-channels hierarchies, and modulation schemes increase potential communications and broadband utility, particularly for Internet usage, however many standards setting entities are discussing licensed spectrums. The disclosed focus is the unlicensed spectrum. The main reason is interference and the economical value rising from availability of unlicensed (communication real estate).

4. Lowering interferences in the unlicensed spectrum frequencies is more acute due to the potential free use. Users of the licensed spectrum are paying higher cost, therefore the providers buy more spectrum bandwidth and the total spectrum available allows more bandwidth to more users with lower interference. Frequencies, channels and sub channels are more manageable by the operators. The unlicensed spectrum may be more vulnerable to interference especially due to the use by public networks of the emergency systems, police, fire departments, and other local governments, airports, colleges, coffee shops hotels and so on, thus the need to effectively manage that which is available.

5. Division of the base station to more than one sector should allow interleaving between sectors and use of the most free (least burdened) sector.

Alternate examples of configurations of wireless architectures using a combination of licensed and unlicensed bands, and WiMax and WiFi combinations, include the following. A wide area network that is combined from a mosaic of base stations of different unlicensed frequencies, or having several frequency modules in the unlicensed spectrum. The network employs 3G, and 4G standards such as WiMax standard, LTE standard and/or other standards in the unlicensed frequencies. The unlicensed spectrum could be in 900 MHz, 2.4 GHz, 3.65 GHz and 5.7 GHz, and upwards to 10 GHz. The base station may interleave between the base stations via a Network Operation Center (NOC) or other operation systems and protocols to reduce potential interference.

Interleaving may also be performed via an internal loop or other operation and protocols. Further, one or more local base stations of the WAN network can further be converted to one or more WiFi local networks, as the WiFi protocols provide a lower interference in a more concise radius. For example the WiMax base station provides at least one floor, one building or several floors in a few buildings on the allowed radius of the base station. The number of users depends on the capacity of the base station and the size of the broadband provided to customers.

Interleaving functions also allow unlicensed broadband WiFi to interchange to WiMax transmission. The WiFi source could be from fiber satellite and or other broadband. For radio and phone, use of new GSM smart phones can be provided with chipsets that can automatically or manually interleave between frequencies in the licensed and unlicensed spectrums, such as between the 900 Mhz and 1800 MHz frequencies.

The disclosed interleaving and/or hopping between different frequency bands permits greater utility of the unlicensed and licensed bandwidth. Due to the economic value of the unlicensed spectrums, it is expected that the FCC will increase the spectrum of the unlicensed spectrum to Internet bandwidth and to radio. LTE and WiMax are optimal in internet and the above combinations will improve the unlicensed capabilities.

The proposed architectures may be more expensive to build and to operate than conventional licensed spectrum usage, however provide substantial utility in the unlicensed space. Further applications include the use of MiMO and applications such as SMS and other multimedia utilities. Such usage of the unlicensed spectrum as disclosed and claimed herein provides guidance to a yet unevolved standard. While WiMax usage if the licensed space is somewhat defined, LTE and successors remains largely undefined. For example, additional transmission power as employed herein is beneficial in rural areas where power greater than 1 watt is needed to effect mobility transmissions. Other political and governmental developments may also affect the evolution of the unlicensed space.

Those skilled in the art should readily appreciate that the programs and methods for wireless network architecture and communication as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains.

The invention claimed is:

1. A wireless network comprising:
    a plurality of wireless base stations operating at a public spectrum frequency, the public spectrum frequency outside a regulatory domain of frequencies in the location where the base stations are deployed;
    a plurality of overlapping coverage areas, each coverage area being generated by one of the wireless base stations to form a Wide Area Network (WAN);
    at least one band of the public spectrum frequency assigned to each of the plurality of wireless base stations; and
    at least one sub channel generated by each base station in the assigned band, each sub channel having a plurality of Orthogonal Frequency Division Multiple Access (OFDMA) sub-carriers, each sub-channel being dedicated to a particular user for data transmission and to minimize interference within the coverage area, the base stations configured to minimize interference by interleaving around the interference.

2. The network of claim 1 wherein the wireless base stations are further operable to identify bands available at other wireless base stations, and interleave by selecting an alternate band for transmission to the other wireless base station.

3. The network of claim 2 wherein each wireless base station is configured to operate in the assigned band according to the IEEE 802.16e standard.

4. The network of claim 2 wherein the selected alternate band is an unlicensed frequency, the unlicensed frequency employed for interleaving and transmission power strength adjustment unencumbered by power and usage restrictions in the regulatory domain of frequencies.

5. The network of claim 4 further comprising a processor to gather, from each wireless base station, usage data defining, for each user, subcarrier, subchannel and band usage, the usage data for permitting billing data collection, Internet interface connectivity metrics, clearinghouse and settlement services, the billing data collection further comprising:
  identifying a carrier providing the wireless service called for by a user in a particular geographic area;
  identifying a user and corresponding billing information; and
  reconciling the provided wireless services with the billing information of the user.

6. The network of claim 5 wherein the unlicensed frequency avoids metering of wireless communication for billing and roaming assessment by wireless carriers of fee-for-services arrangements in the licensed spectrum.

7. The network of claim 2 further comprising an interference mitigation sub- channel, the interference mitigation sub channel having subcarriers remaining idle until invoked for mitigating interference on other sub-channels by providing a noninterference communication path.

8. The network of claim 2 wherein each wireless base station is configured to operate in the assigned band according to OFDMA modulations including at least one of HSPA (High Speed Packet Access), HSPA+, LTE,(Long Term Evolution), LTE Advanced or 3GPP (3rd Generation Partnership Project).

9. A method for wireless communications comprising:
  identifying a plurality of frequency ranges configured for wireless operation; the frequency ranges including licensed bands and unlicensed bands;
  selecting an unlicensed band for a communication, the selected band subdivided into a plurality of subchannels, each sub channel including a set of subcarriers for communications with a particular user;
  computing a set of the subcarriers in the selected band for the communication;
  detecting interference on at least one of the computed subcarriers; and
  mitigating the detected interference by invoking mitigation techniques, the mitigation techniques including interleaving by identifying other subcarriers in the sub channel having less susceptibility to interference.

10. The method of claim 9 further comprising identifying a coverage area corresponding to the user, the coverage area provided by a base station configured for communication in the selected band, the coverage area overlapping with other coverage areas corresponding to other base stations; and
  wherein mitigating further includes transmitting to the other base station in the identified other subcarrier.

11. The method of claim 9 wherein the wireless operation is according to a WiMax standard, each of the bands having a plurality of contiguous orthogonal subcarriers spread continuously over the band, and a plurality of subchannels, each subchannel carrying communications to a particular user, the subchannel including a plurality of noncontiguous subcarriers, the unlicensed bands including 900 MHz, 2.4 GHz, 3.65 GHz and 5.7 GHz.

12. The method of claim 11 wherein the subcarriers are orthogonal to a frequency of adjacent subcarriers, the subcarriers defining a sub channel being non-adjacent to the other subcarriers in the channel.

13. The method of claim 9 wherein mitigating further comprises: identifying a recipient user device or base station of the communication; and
  adjusting transmission power responsive to a location of the recipient user device or base station, the adjusted transmission power greater than that specified in the licensed band.

14. The method of claim 13 wherein mitigating further comprises adjusting transmission power of the base station responsive to detected interference and a location of recipients of the communication, adjusted transmission power greater than that specified in the licensed band.

15. The method of claim 13 wherein the coverage area is subdivided into sectors, mitigating further comprising:
  identifying a sector in which the recipient is located; and
  performing interleaving and power adjustment for subcarriers directed to the identified sector.

16. The method of claim 9 wherein detecting interference further comprises employing listen-before-talk (LBT) operation for identifying potentially interfering communications.

17. The method of claim 16 wherein computing the set of subcarriers further comprises:
  employing LBT to identify potentially interfering subcarriers in overlapping coverage areas; and
  selecting subcarriers based on a degree of frequency separation to avoid interference.

18. The method of claim 13 wherein mitigating interference further comprises:
  identifying a coverage area including the recipient of the communication;
  detecting potential interference on a direct path to the recipient; and
  based on the detected interference, identifying an intermediate base station having a non- overlapping coverage area; and
  transmitting to the intermediate base station for subsequent transmission to the recipient.

19. The method of claim 18 further comprising selecting, at the intermediate base station, a subcarrier and transmission power level for avoiding interference; and
  transmitting in the selected subcarrier and power level to the recipient.

20. The method of claim 11 further comprising, upon detecting interference, selecting an alternate band.

21. The method of claim 20 further comprising
  determining a set of cells including a sender and the recipient of a wireless communication, each of the cells responsive to a base station;
  identifying if interference exists on a potential path between the sender and the recipient; and
  selecting an alternate path using another base station using the alternate band.

22. A computer program product stored on a non-transitive computer program storage medium that, when executed by a processor, cause the computer to perform a method for wireless communications, the method comprising:

identifying a plurality of frequency ranges configured for wireless operation; the frequency ranges including licensed bands and unlicensed bands;

selecting an unlicensed band for a communication, the selected band subdivided into a plurality of subchannels, each sub channel including a set of subcarriers for communications with a particular user;

computing a set of the subcarriers in the selected band for the communication;

detecting interference on at least one of the computed subcarriers; and mitigating the detected interference by invoking mitigation techniques, the mitigation techniques including interleaving by identifying other subcarriers in the subchannel having less susceptibility to interference.

* * * * *